May 30, 1950 K. F. NYSTROM ET AL 2,509,694
RAILWAY CAR TRUCK
Filed March 13, 1948 2 Sheets-Sheet 1
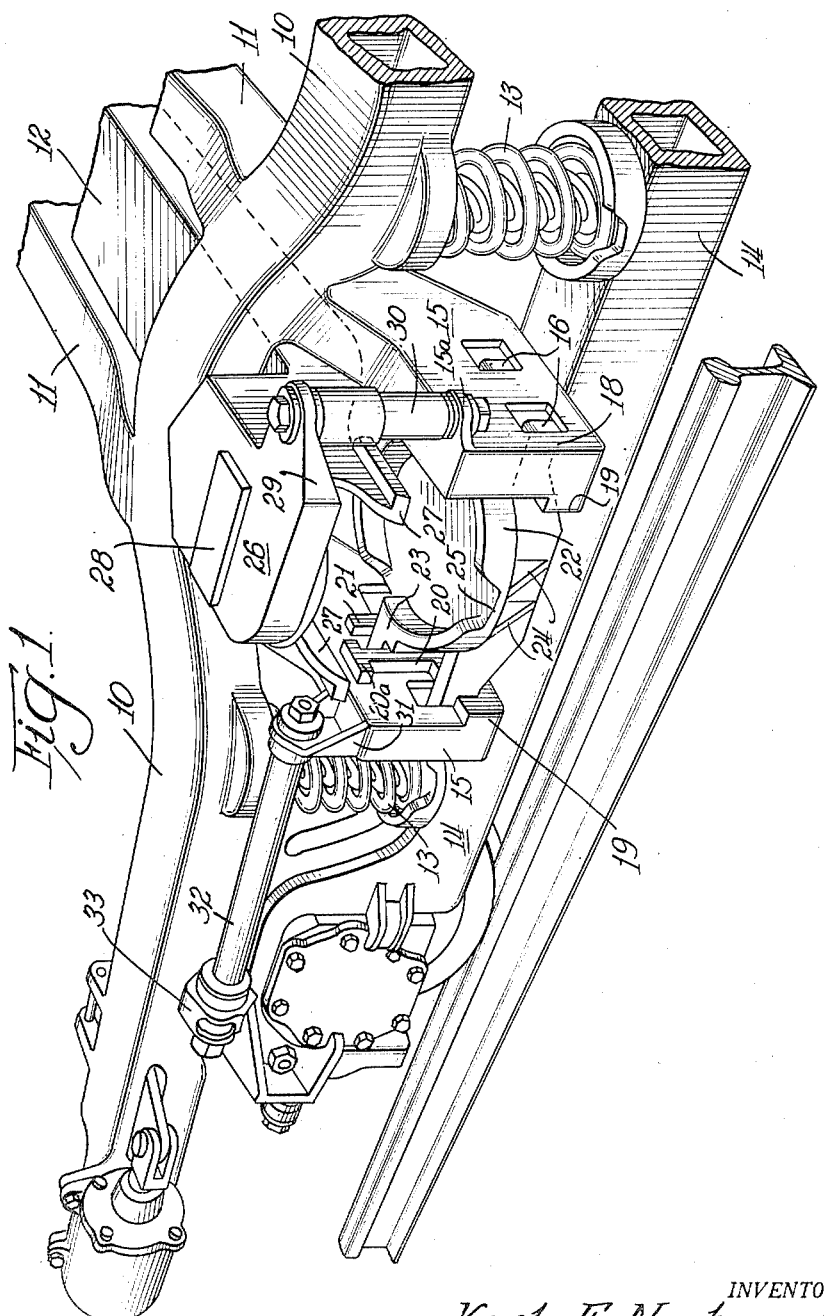
INVENTORS:
Karl F. Nystrom and
Vernon L. Green
By:- George Heidman Atty.

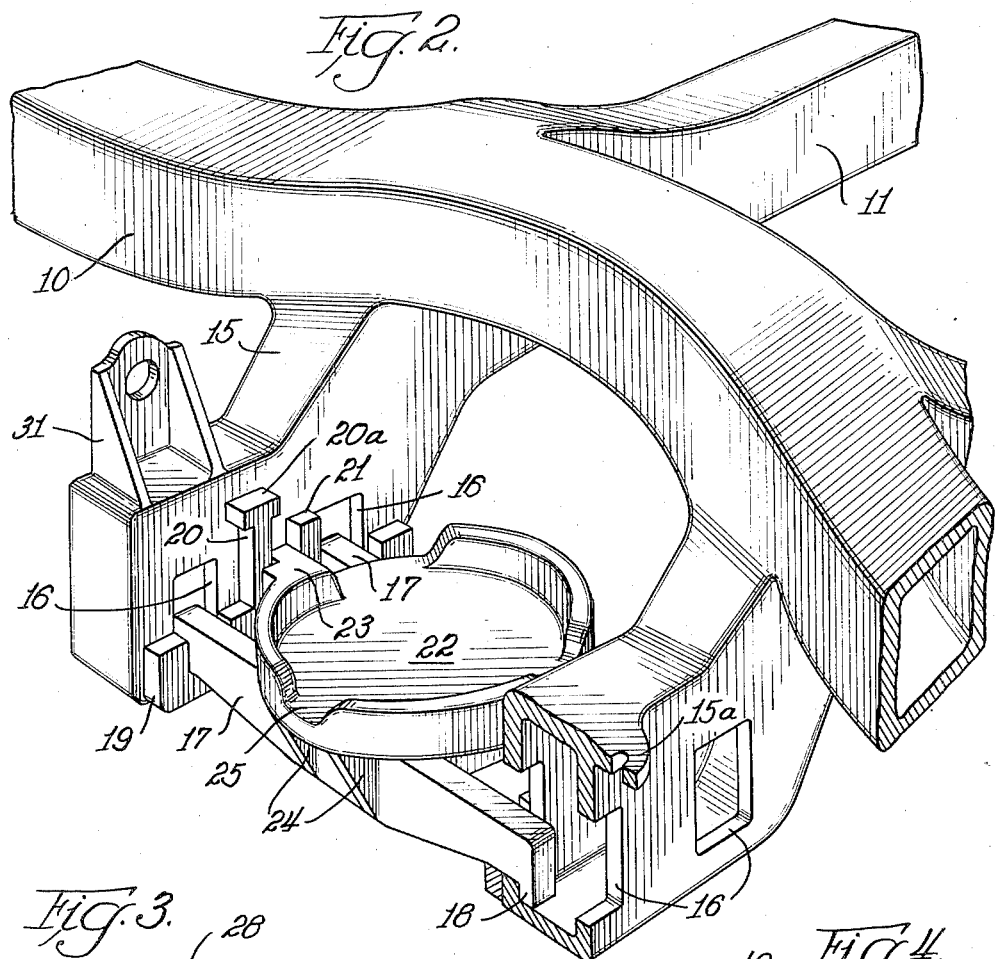
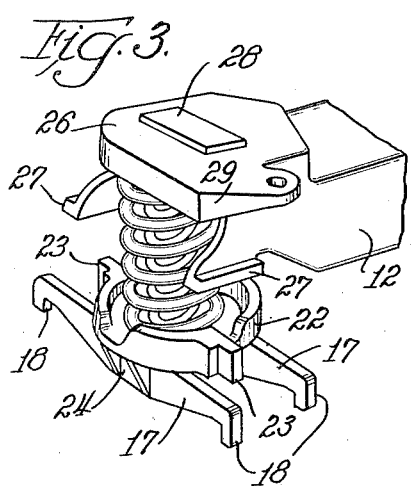
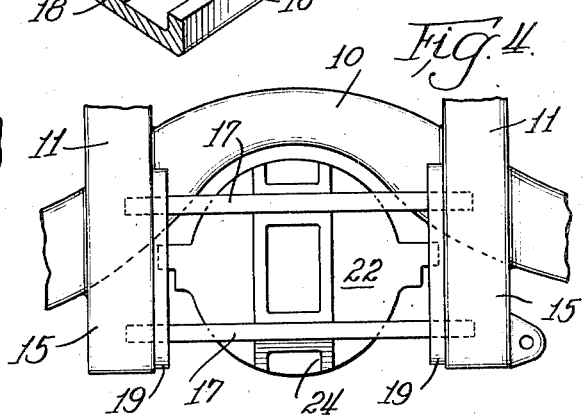
INVENTORS:
Karl F. Nystrom and
Vernon L. Green

Patented May 30, 1950

2,509,694

UNITED STATES PATENT OFFICE 2,509,694

RAILWAY CAR TRUCK

Karl F. Nystrom, Nashotah, and Vernon L. Green, Milwaukee, Wis.

Application March 13, 1948, Serial No. 14,778

7 Claims. (Cl. 105—197)

Our invention relates more particularly to the frame and bolster construction of a railway car truck and to the means and method of the bolster spring suspension and its control and regulation, whereby an easier riding truck is provided and the spring suspension more readily applied and controlled, as the spring suspension is easily accessible and elevation of the bolster accomplished without need for placing the car truck over a pit and without disturbing the equilibrium of the car.

Our improved construction provides a wider spring base by the increased distance between the springs in opposite ends of the truck bolster and hence reduces car roll.

The structure eliminates the use of swing hangers and spring plank; permits use of longer springs located to the truck side exterior which greatly facilitates spring inspection as well as great resistance to car rolling.

Our invention more specifically stated involves outwardly disposed transom extensions of box-like form in cross-section adapted to receive the truck bolster spring suspension therebetween employing coil spring holding elements supported between the transom extensions by removable and replaceable keys; and means operatively intermediate the spring holding elements and the transom extensions whereby proper positioning of the elements will be maintained and spring seating prevented.

The aforementioned objects and the advantages inherent in our invention will be readily comprehended from the detailed description of the accompanying drawings wherein—

Figure 1 is a perspective view of a portion of a railroad car truck frame and wheel piece at one side of the truck and one end of the truck bolster, illustrating the improved means for mounting the bolster supporting springs; the springs being omitted and portions broken away for the sake of clarity.

Figure 2 is a perspective view of the intermediate or bolster receiving portion of the truck frame, showing our improved bolster spring suspension mounting with portions broken away and the bolster and springs omitted.

Figure 3 is a perspective view, on a reduced scale, of the bolster end with the spring holding construction and spring in place.

Figure 4 is a bottom plan view, on a reduced scale, of the transom extensions and connecting frame portion, the bottom of the spring cup and its supporting keys, as shown in Figure 2.

Our invention, for purposes of exemplification, is shown applied to a pedestalless type truck but as the wheeled journals, bearings and other elements usually involved in conventional trucks form no part of our present invention, illustration of such elements is not deemed necessary. Furthermore, as the truck bolster, truck transom construction and spring suspension are of similar construction at both sides of the truck illustration and description of one side of the truck is sufficient to present the invention; the invention, however, being applicable to a car truck with or without equalizer members.

The invention contemplates location of the truck bolster springs on the outer sides of the truck side frame members of which a portion of one side frame is shown at 10, provided with the spaced transom members 11, 11 formed integral with the side frame member; the transom members being spaced apart in the usual manner to receive the truck bolster therebetween, of which a part or one end is shown at 12.

In the particular exemplification the truck frame is spring supported at 13 (only one spring being shown) on the equalizer member 14, one end whereof is broken away.

The transom members 11, 11 are shown integral with the side frame member and are provided with end portions or extensions 15, 15 formed integral with the lower side of the frame members, which extend beyond the outer side of the frame member 10. The transom extensions 15, 15 are preferably hollow or box-like in cross-section as more clearly shown in Figure 2 with vertically disposed side walls; the outer ends of the extensions being disposed in a horizontal plane beneath the horizontal planes of the side frame and the major portions of the transom members, see Figure 2.

The vertical sides of the transom extensions 15, 15 are each provided with a pair of laterally spaced openings or holes 16, 16 arranged in horizontal alignment; the openings 16, 16 being arranged in both side walls of each extension as more clearly shown in Figure 2. The openings 16, 16 are intended to receive the ends of the spring cup supporting bars or keys 17, 17 which extend across the gap between the transom extensions in parallel relation, see Figure 2. The ends of the bars or keys 17, 17 on their lower edges preferably are formed with depending lips 18, see Figure 2; the bars or keys being of length such that the ends will be confined within the box-like extensions and not be exposed at the outer sides of the transom extensions; the structure thus eliminating any possibility of extraneous blows on the ends of the bars or keys which might cause displacement of the keys and cause disturbance of the car equilibrium.

The inner faces of the transom extensions 15, 15 are shown provided with reenforcing members 19, preferably welded to or formed integral with the extensions and provided with notches or grooves coincident with the openings 16; these bars or members 19 also providing greater bearing surfaces for the ends of the keys 17.

The transom extensions 15 on their inner opposing faces and intermediate the pair of openings 16, 16 are each provided with a pair of horizontally spaced vertical ribs or guides 20 and 21; the rib or guide 20 being of greater vertical length and therefore extends above the plane of the top of guide 21; the rib 20 at its top being provided with a transversely disposed head 20a; it being understood the construction and arrangement of the ribs or guides on the non-visible side of one of the transom extensions is the same as described; these ribs or guides being for the purpose hereinafter described.

The cross bars or keys 17, 17 provide support for a spring cup 22, provided at diametrically opposite sides with laterally disposed lugs or lips 23 adapted to slidingly fit between the guides 20, 21 on each transom extension 15; and the vertical side of the lip adjacent rib or guide 20 is shown preferably shouldered to overlap the outer vertical side of the longer guide member 20. The upstanding peripheral flange of the cup 22 at the inner side may be provided with a cut-out as indicated at 22a.

The cup 22 on its lower side preferably is provided with depending flanges or brackets as at 24 arranged diametrically opposite each other and adapted to overlap the vertical faces or sides of the bars or keys 17, 17; while the cup-flange disposed toward the outer ends of the transom extensions is shown partially cut-away at 25 to provide a sight opening and enable vision of the proper seating of the vertically disposed coil springs (omitted in the drawings for purposes of clarity) which seat in and are supported by the cup member 22.

The truck bolster ends extend beneath the side frame members 10 and outwardly therebeyond and each end terminates in the downwardly facing and vertically enlarged cap portion 26 adapted to receive the upper ends of suitable vertically disposed coil springs (not shown) whose lower ends seat in the cup members 22; the side circumferential flanged or side walls of the cup 22 and of the cap 26 holding the ends of the springs in non-shifting position.

The inverted cap portions of the truck bolster are formed with depending side walls at opposite sides of the bolster and the lower edges of the side walls adjacent the outer ends of the extensions shown provided with laterally disposed straight horizontal flanges 27 adapted to enter the gap between the transom extensions 15, 15; the flanges 27 extend into the vertical planes of the vertical ribs 20 which latter extend into horizontal planes slightly above the tops of the vertical ribs or guides 21, thus providing clearance for the tapered sides of the bolster ends and enable lateral or transverse play of the bolster; while the flanges 27 will engage the tops or heads 20a of the elongated ribs 20, 20 during excessive downward movement of the bolster and prevent seating or "going solid" of the springs.

The top of the inverted cap portion 26 is provided with a side bearing plate or pad element 28; and the cap member at one side is shown provided with a lateral extension or bracket 29 for attachment of a snubber 30 whose lower end is attached to and seats on a laterally extending lip 15a on the outer side of one of the transom extensions 15, see Figure 1; while the top of the other transom extension 15 is provided with an upstanding bracket 31 to which one end of a pullrod 32 is secured; the opposite end of the pull rod being secured to an upstanding bracket 33 formed on or properly secured to the equalizer or wheel piece 14. The equalizer 14, at opposite sides of the transom extensions, is provided with spring seats for receiving coil springs whereby the frame member is yieldingly mounted on the equalizer.

The guides on the vertical side faces of the transom extensions hold the spring cup in proper position, while the springs are being compressed and also hold the brackets on the bottom of the cup aligned with the openings in the transom extensions to permit insertion of the bars or keys beneath the cup. The spring cup lateral extensions or lips in conjunction with the vertical guides hold the cup against buckling or rotative movement and maintain the cup in proper vertical position beneath the bolster inverted cup or cap. The cup guides on the inner opposing faces of the transom extensions preferably are in the nature of transversely spaced vertical ribs, with the outer rib of each pair of greater vertical length so as to engage the laterally disposed portions of the bolster cap side walls and prevent seating of the springs during excessive load conditions on the bolster or in the event of broken springs; while the inner rib of each pair terminates beneath the plane of the top of the outer ribs to provide for relative lateral or transverse play or movement between the bolster and transom extensions.

With our improved transom extensions as shown in the drawings, the ends of the spring cup supporting bars or keys are entirely housed within the extensions and protected from extraneous blows; the insertion of shims intermediate the keys and cup-bottom being easily accomplished through the openings in the extension sides so that regulation or leveling of the bolster and superposed car may be readily made and the ends of the shims housed within the transom extensions; while the spring cups are entirely arranged within the bounds of the transom extensions and hence protected against extraneous blows or interference.

The exemplification of our invention as disclosed in the drawings and described in the specification is believed to be the simplest and best embodiment of the invention, but structural modifications may be possible without, however, departing from the spirit of our invention as defined by the appended claims.

What we claim is:

1. In a railway car truck, side frame members provided with a pair of horizontally spaced transom members whose ends extend downwardly outwardly beyond the side frame members and terminate in hollow box-like extensions provided with spaced apart openings in their side walls and the opposing faces of said extensions provided with vertically extending guide-ways; a bolster disposed transversely of the truck between said transom members with the ends of the bolster extending beyond the side frame members and provided on the bottoms with coil spring receiving cavities and with depending sides adapted to extend between the transom extensions; coil spring holding cups disposed between the transom extensions and beneath the bolster ends at opposite sides of the truck adapted to be held against rotative movement by said guide-ways; and spring cup supporting keys disposed transversely between the transom extensions in supporting relation with the bottoms of the cups with the ends of the keys extending into said openings in the transom extensions and supported by the latter.

2. In a railway car truck side frame member provided with a pair of horizontally disposed and laterally spaced transom members whose ends extend outwardly beyond the side frame members to terminate in vertically disposed box-like extensions provided in their side walls with spaced apart openings intermediate the tops and bottoms thereof and the inner opposing faces of the extensions provided with transversely spaced vertical ribs; keys disposed transversely between the transom and extensions and endwisely insertible in said openings with their ends housed within and supported by said extensions; a spring holding cup disposed between and beneath the tops of each pair of transom extensions and seatable on said keys, said cups at opposite sides having laterally disposed lips slidable between the vertical ribs to hold the cups against rotative and longitudinal movement; coil springs seated in said cups; a bolster arranged between the transom members with its ends extending beyond the side frame members and provided with downwardly facing spring holding cap members having depending sides adapted to enter between said transom extensions above said spring holding cups; the sides of the cap members and of one of the transom ends being provided with laterally disposed lugs; and vertically disposed snubber means secured to said lugs of the bolster cap members and the transom extensions.

3. In a railway car truck, frame members; rigid vertically disposed box-like extensions at the outer sides of the frame members arranged in spaced relation with vertical side walls and having openings in the side walls with the openings in the opposing faces of the box-like extensions aligned with each other, the inner opposing faces of the extensions having vertically extending guideways; keys disposed between each pair of extensions with their ends inserted in said openings of said extensions and removably supported by the extensions; a spring holding cup arranged between the extensions at each side of the truck seatable on said keys and provided at opposite sides with laterally extending lips adapted to slidably engage said guideways and prevent horizontal movement of the cup; a vertically disposed coil spring seated in the cup; and a bolster whose ends extend beyond the sides of the truck and terminate in downwardly facing spring receiving caps having depending side portions adapted to enter between said extensions, said depending side portions being disposed in the vertical planes of said guideways to engage the tops thereof and thereby limit the downward movement of the bolster.

4. In a railway car truck, side frame members; vertically disposed box-like extensions at the outer sides of the frame members arranged in spaced relation and having openings in the vertical side walls of the extensions and vertical guideways on the opposing faces of the extensions intermediate the openings; keys extending between each pair of extensions with their ends seated in said openings and supported by the box-like extension side walls; a coil spring holding cup arranged between each pair of extensions seated on said keys and having side portions arranged in vertical sliding relation with said guideways whereby lateral and rotative movements of the cup are prevented; a vertically disposed spring seated in said cup; a truck bolster whose ends extend beyond the side frame members and are provided with downwardly facing coil spring receiving cap-like portions having depending side walls; and means arranged on the side walls of said box-like extensions in the path of the side walls of said cap-like portions whereby the degree of vertical downward movement of the bolster caps toward said spring holding cups is limited.

5. In a railway car truck, side frame members; vertically disposed box-like extensions extending laterally at the outer sides of the frame members, arranged in spaced relation and having vertical openings in the side walls beneath the tops thereof; a coil spring holding cup at each side of the truck arranged between each pair of extensions beneath the tops of the latter and within the vertical planes of the outer ends of said extensions, each spring holding cup having interengaging relation with the inner side faces of the extensions whereby lateral movement of the cup is prevented and vertical movement of the cup permitted; a vertically disposed coil spring seated in the cup; cup supporting elements extending transversely between each pair of extensions with their ends disposed into said vertical openings and supported by said box-like extensions and formed to have interengaging relation with the inner side walls of the extensions; a truck bolster whose ends extend beyond the side frame members and are provided with downwardly facing coil spring receiving caps disposed within the vertical planes of the inner sides of each pair of extensions, said caps receiving the upper ends of said coil springs; and means arranged on the inner faces of said box-like extensions in the path of the side walls of said caps for limiting the vertical movement of said bolster cap portions toward said spring holding cups.

6. In a railway car truck, side frame members with a pair of integral transom members whose ends extend downwardly outward beyond the side frame members and each transom member formed to provide vertically disposed box-like portions having opposing side walls with vertically extending and transversely disposed openings beneath the top walls thereof, the ends of one of said transom members at opposite sides of the truck having a vertically disposed pull-rod receiving bracket while the ends of the other transom members have snubber holding brackets; a coil spring holding cup arranged between each pair of transom ends beneath the tops thereof; interengaging surfaces on the inner side walls of the transom ends and sides of said cup whereby lateral and rotative movements of the cups are prevented and vertical movement permitted; a coil spring seated in each cup; cup supporting keys arranged between each pair of box-like extensions with the ends of the keys extending into the opposing side wall openings and formed to effect interengagement therewith; and a truck bolster whose ends extend beyond the side frame members and are provided with downwardly facing coil spring receiving caps arranged above the respective coil spring holding cups and having laterally disposed snubber holding lugs; and vertically extending snubbers secured at the top and bottoms to said lugs and to the bracket on a transom end.

7. In a railway car truck, side frame members each of which is provided on its outer side intermediate its ends with a pair of outwardly disposed extensions spaced longitudinally of the side frame members and each pair provided with opposing vertical faces having aligned openings; spring holding members loosely arranged between said extensions; supporting elements for said spring holding members extending between the extensions and supported in said openings and having supporting relation with the bottoms of said holding members; a transversely disposed bolster having ends disposed beyond the side frame members and provided with downwardly facing spring receiving portions, said portions having depending sides adapted to extend between said spaced extensions at each side of the truck; and springs seated between said spring holding members and said spring receiving portions.

KARL F. NYSTROM.
VERNON L. GREEN.

No references cited.